(12) United States Patent
Martin et al.

(10) Patent No.: US 11,401,891 B2
(45) Date of Patent: Aug. 2, 2022

(54) APPARATUS FOR DESUPERHEATING HIGH TEMPERATURE, HIGH VELOCITY STEAM

(71) Applicant: BWXT Nuclear Energy, Inc., Lynchburg, VA (US)

(72) Inventors: Robert Paul Martin, Lynchburg, VA (US); Jeremy Leslie Gustafson, Lynchburg, VA (US); Ryan Z. Ziegler, Forest, VA (US); Charles Larry Fisher, Forest, VA (US); James Brian Inman, Forest, VA (US)

(73) Assignee: BWXT Nuclear Energy, Inc., Lynchburg, VA (US)

( * ) Notice: Subject to any disclaimer, the term of this patent is extended or adjusted under 35 U.S.C. 154(b) by 135 days.

(21) Appl. No.: 16/741,097

(22) Filed: Jan. 13, 2020

(65) Prior Publication Data
US 2020/0240364 A1 Jul. 30, 2020

Related U.S. Application Data

(60) Provisional application No. 62/796,492, filed on Jan. 24, 2019.

(51) Int. Cl.
*F02K 9/64* (2006.01)
*F22G 5/12* (2006.01)

(52) U.S. Cl.
CPC .......... *F02K 9/64* (2013.01); *F05D 2260/205* (2013.01); *F22G 5/123* (2013.01)

(58) Field of Classification Search
CPC . F22G 5/12; F22G 5/123; F22G 5/126; F22G 5/14; F22G 3/008; F25B 40/00; F01K 13/02; F22B 1/18; F22B 35/10; F02K 9/64
See application file for complete search history.

(56) References Cited

U.S. PATENT DOCUMENTS

| 2,575,119 A | 11/1951 | Peebles |
| 3,605,386 A * | 9/1971 | Erwin et al. ........... B01D 47/06 96/236 |
| 4,481,171 A | 11/1984 | Baran et al. |
| 4,519,990 A | 5/1985 | Bevilaqua et al. |

(Continued)

FOREIGN PATENT DOCUMENTS

| GB | 315629 A | 7/1929 | |
| GB | 2049902 A * | 12/1980 | ................ F25C 1/12 |
| JP | 3131815 B2 * | 2/2001 | |

OTHER PUBLICATIONS

International Search Report and Written Opinion, PCT/US2020/12761, dated Jun. 2, 2020, 7 pages.

*Primary Examiner* — Steven S Anderson, II
(74) *Attorney, Agent, or Firm* — Nelson Mullins Riley & Scarborough LLP

(57) ABSTRACT

A desuperheating spray chamber for use in a rocket exhaust recovery system for a nuclear thermal propulsion rocket, including a substantially-cylindrical outer tank with an upper end including an entrance port and two exhaust ports, a substantially-cylindrical shroud extending downwardly from an inner surface of the upper end of the tank, an annular inner spray ring that is both disposed within and concentric with the shroud; and an annular outer spray ring that is disposed between a side wall of the outer tank and the shroud, the annular outer ring being concentric with the shroud.

15 Claims, 8 Drawing Sheets

(56) References Cited

U.S. PATENT DOCUMENTS

| | | | |
|---|---|---|---|
| 4,596,235 A * | 6/1986 | Bougard | F23C 7/004 126/350.1 |
| 4,762,538 A | 8/1988 | Michler et al. | |
| 5,135,611 A | 8/1992 | Cameron | |
| 5,264,078 A | 11/1993 | Bayliss et al. | |
| 5,924,391 A * | 7/1999 | Baker, IV | F24H 1/107 126/359.1 |
| 9,052,121 B2 * | 6/2015 | Cooper | F24H 1/06 |
| 2012/0017852 A1 | 1/2012 | Geelhart et al. | |
| 2017/0038141 A1 | 2/2017 | Zwayyed | |

* cited by examiner

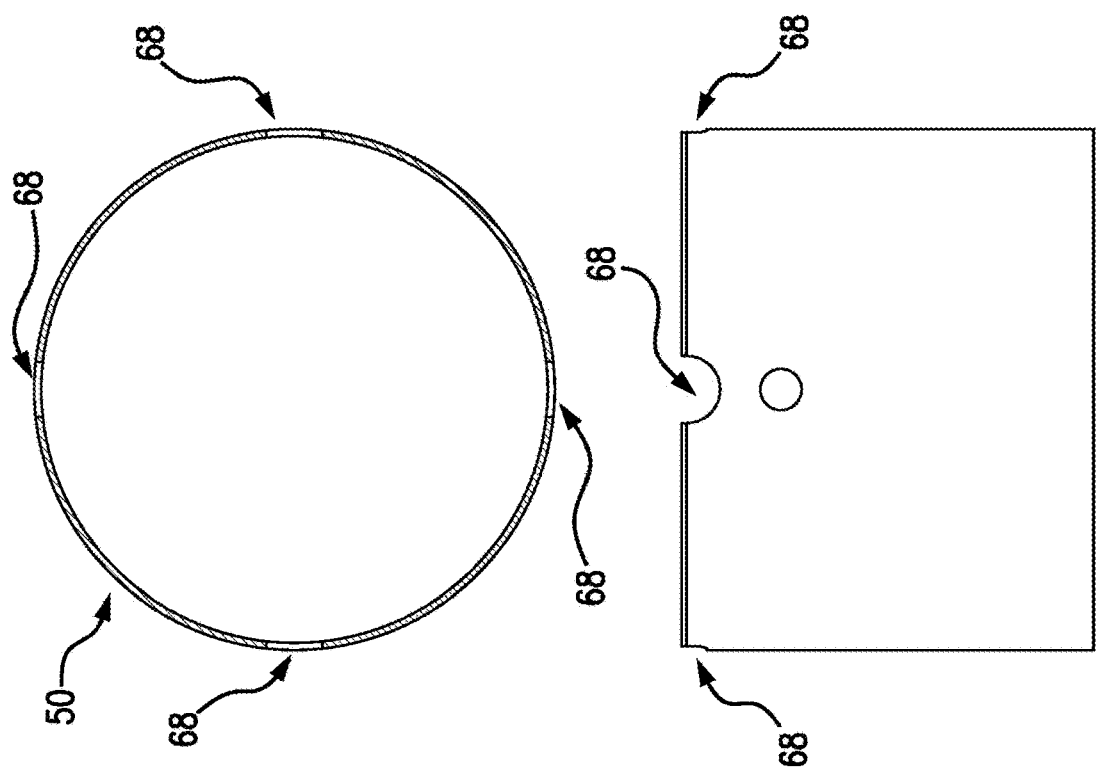
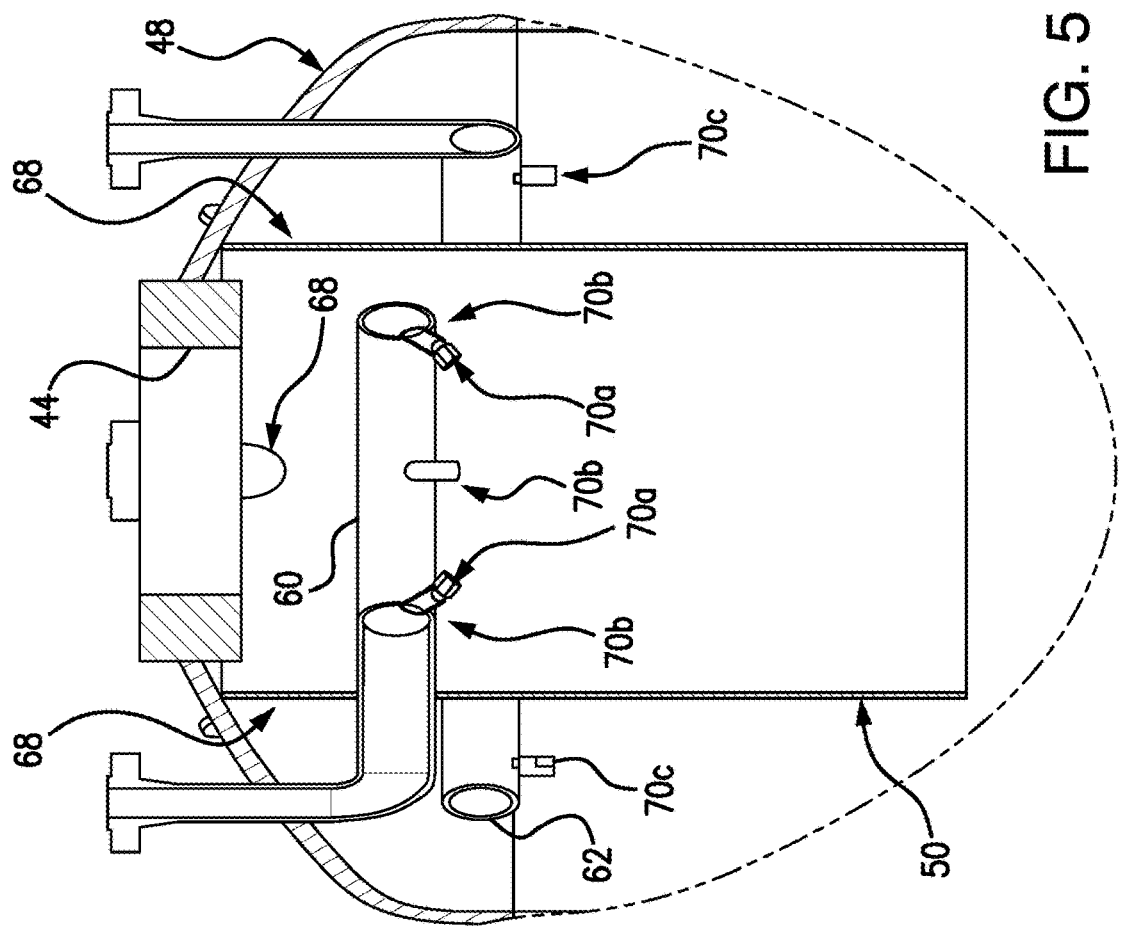
FIG. 6
FIG. 5

| | |
|---|---|
| Exhaust Flow | 2.8 lbm/s |
| Spray Flow | 25.2 lbm/s |
| Outlet Flow | 22-26 lbm/s |
| Drain Flow | 0-2 lbm/s |
| Outlet Pressure | 14.6 psia |
| Inlet Pressure | 15.2 psia |
| Outlet Temperature | ~Saturation |

FIG. 13

APPARATUS FOR DESUPERHEATING HIGH TEMPERATURE, HIGH VELOCITY STEAM

CLAIM OF PRIORITY

This application claims priority to U.S. provisional patent application No. 62/796,492 filed Jan. 24, 2019, the disclosure of which is incorporated by reference herein.

GOVERNMENT SUPPORT CLAUSE

This invention was made with government support as a subcontract under Contract NNS15AA01C (S3) awarded by the National Aeronautics and Space Administration. The Government has certain rights in the invention.

TECHNICAL FIELD

The presently-disclosed invention relates generally to nuclear reactors and, more specifically, to devices for desuperheating exhaust steam from nuclear thermal propulsion engines.

BACKGROUND

The concept of utilizing nuclear thermal propulsion (NTP) to propel spacecraft during space travel is known. In developing the technology related to propelling spacecraft in this manner, it is necessary to be able to test the NTP engines while minimizing the potential release of fission products into the environment. As such, rocket exhaust capture systems (RECS) have been proposed to receive the exhaust from a corresponding NTP engine during active testing. One such RECS 10 is shown in FIG. 1. The NTP engine 12 being tested is disposed within a shielded engine containment 14, with the hydrogen exhaust plume being received in a duct 16 after passing through a water-cooled diffuser 18 that transitions the exhaust plume flow from supersonic to subsonic in order to allow stable burning with injected liquid oxygen ($LO_2$). By-products include steam, excess $O_2$ and potentially a small fraction of noble gasses (e.g., xenon, krypton, etc.).

In order to collect the exhaust and associated by-products, the exhaust plume is passed through water cooled ducts 20 prior to entering a first heat exchanger 22. Heat is dissipated from the steam/$O_2$/noble gas mixture in the heat exchanger 22 in order to lower the mixture temperature and condense the steam. The condensate is collected in a water tank 24 along with any radioactive particulates that may be entrained in the flow. A filter 26 is used to clear the drainage prior to release. A second heat exchanger 28 is also used to cool the residual gasses for storage in a LOX demar 30. The inability to properly cool the exhaust plume prior to entering the first heat exchanger 22 can lead to reduced efficiencies and potential issues within the first heat exchanger 22 and water tank 24.

There at least remains a need, therefore, for improved devices for desuperheating the exhaust plumes of NTP engines during testing operations.

SUMMARY OF INVENTION

One embodiment of the present invention provides a desuperheating spray chamber for use in a rocket exhaust recovery system for a nuclear thermal propulsion rocket, including a substantially-cylindrical outer tank with an upper end including an entrance port and two exhaust ports disposed thereon, a substantially-cylindrical shroud extending downwardly from an inner surface of the upper end of the tank, wherein the shroud is concentric to the entrance port about a longitudinal center axis of the outer tank, an annular inner spray ring that is both disposed within and concentric to the shroud about the longitudinal center axis, and an annular outer spray ring that is disposed between a side wall of the outer tank and the shroud, the annular outer ring being concentric to the shroud about the longitudinal center axis.

Another embodiment of the present invention provides a desuperheating spray chamber for use in a rocket exhaust recovery system for a nuclear thermal propulsion rocket, having a substantially-cylindrical outer tank with an upper end including an entrance port and at least one exhaust port disposed thereon, a substantially-cylindrical shroud extending downwardly from an inner surface of the upper end of the tank, an annular inner spray ring that is disposed within the shroud about a longitudinal center axis of the outer tank; and an outer spray ring that is disposed between a side wall of the outer tank and the shroud.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

The invention now will be described more fully hereinafter with reference to the accompanying drawings, in which some, but not, all embodiments of the invention are shown. Indeed, this invention may be embodied in many different forms and should not be construed as limited to the embodiments set forth herein; rather, these embodiments are provided so that this disclosure will satisfy applicable legal requirements.

FIG. 5 is a partial cross-sectional view of the desuperheating spray chamber shown in FIGS. 2A and 2B;

FIG. 6 is a top view and a side view of the desuperheating spray chamber shown in FIGS. 2A and 2B;

FIG. 13 is a chart showing analysis results of the operation of the desuperheating spray chamber shown in FIGS. 2A and 2B.

Figure 1:
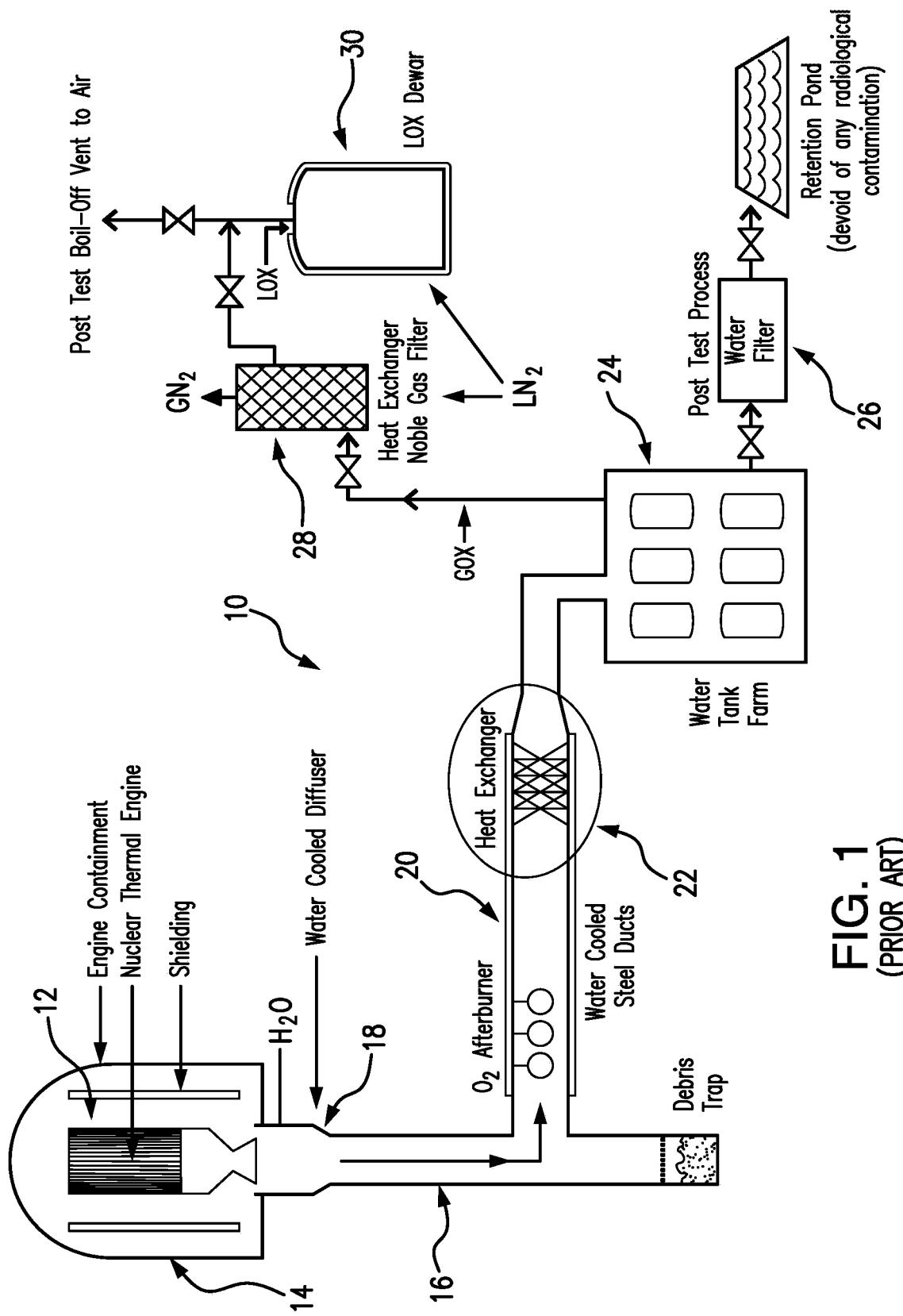
FIG. 1 is a schematic diagram of a prior art rocket exhaust collection system (RECS)
Figure 2B:
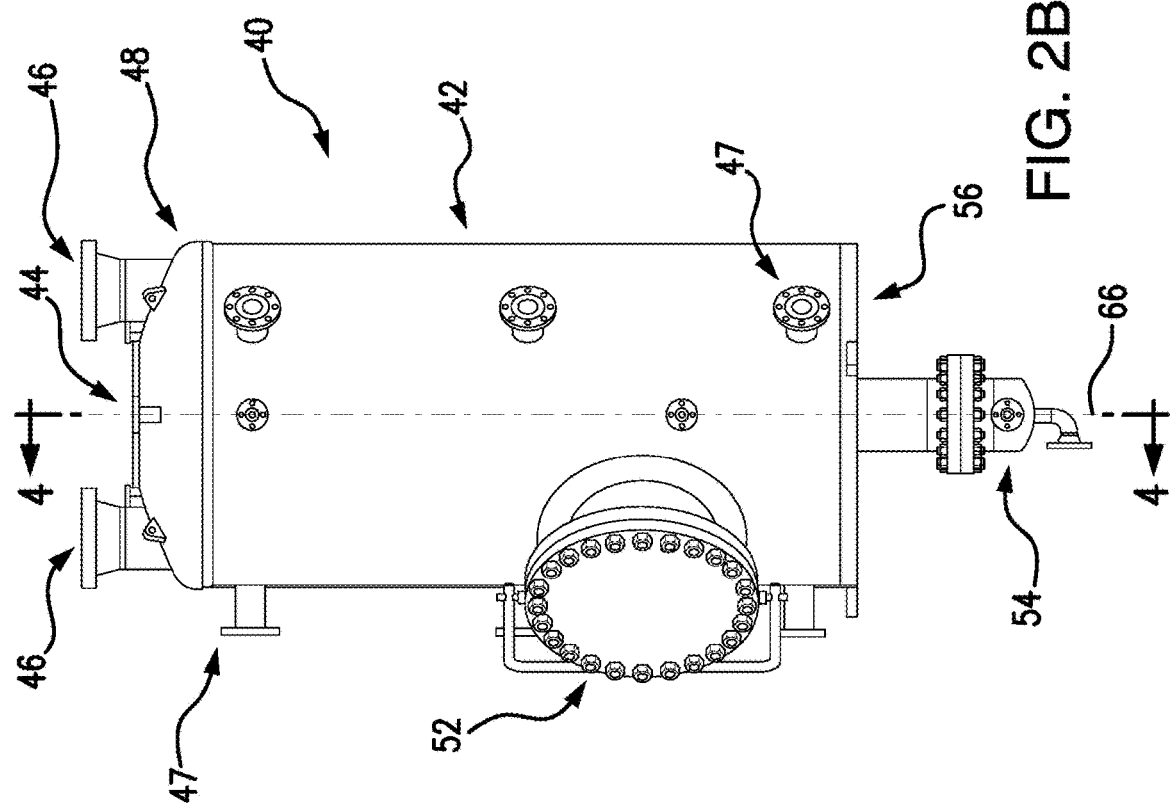
FIGS. 2A and 2B are a perspective view and a side view of desuperheating spray chamber in accordance with an embodiment of the present invention, for use in a RECS.
Figure 2A:
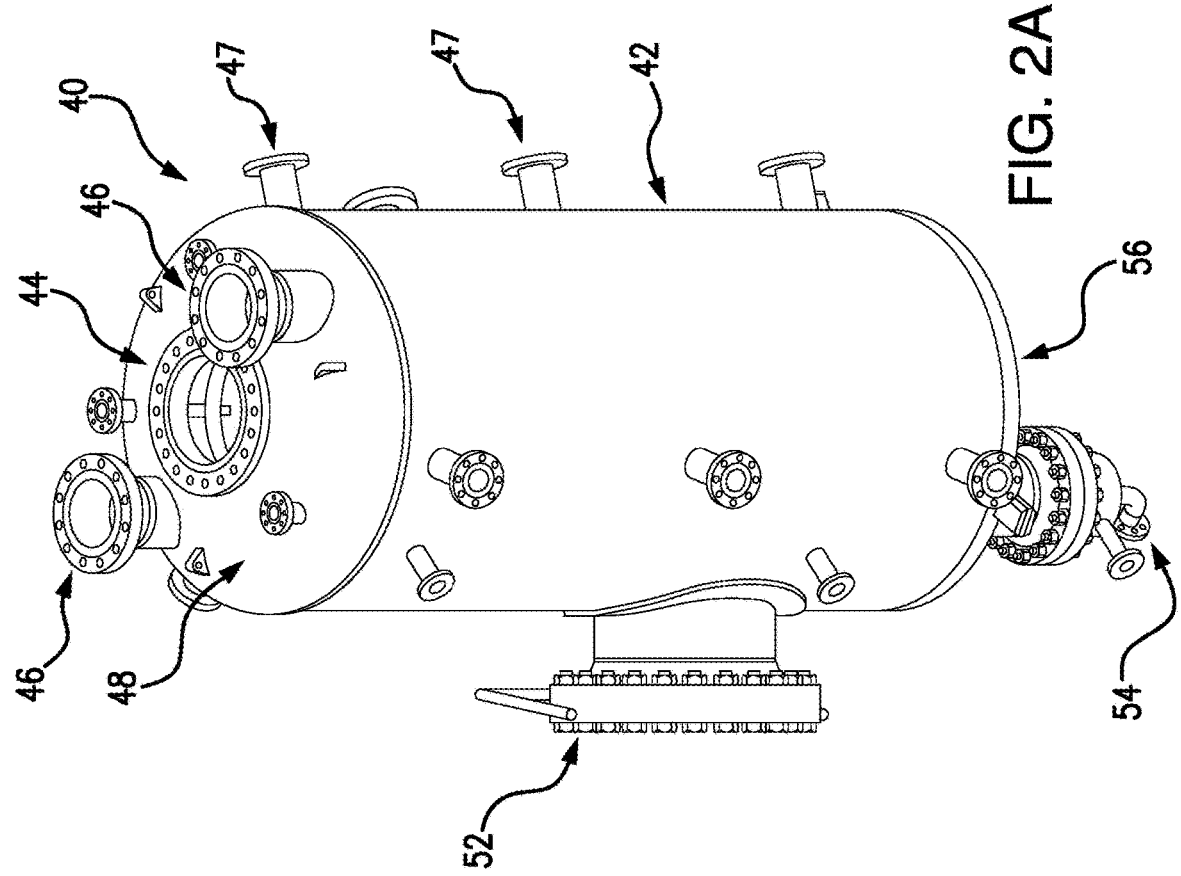

Repeat use of reference characters in the present specification and drawings is intended to represent same or analogous features or elements of the invention according to the disclosure.

DETAILED DESCRIPTION

The invention now will be described more fully hereinafter with reference to the accompanying drawings, in which some, but not all, embodiments of the invention are shown. Indeed, this invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

Referring now to the figures, the present invention is directed to desuperheating spray chambers and is figured to cool high temperature, high velocity exhaust steam from a nuclear thermal propulsion (NTP) engine as part of a rocket exhaust collection system (RECS). As shown in FIGS. 2A through 4, a desuperheating spray chamber 40 in accordance with the present invention includes a substantially-cylindrical outer tank 42 including an entrance port 44 and two exhaust ports 46 on its upper end 48, a substantially-cylindrical inner shroud 50 extending downwardly from its upper end 48, a manway 52 extending radially-outwardly from its side wall, a drain assembly 54 extending downwardly from its bottom end 56, an inner and outer spray rings 60 and 62, respectively, disposed within the upper end of the tank. The entrance port 44 is configured to receive a rocket exhaust plume 64 (FIG. 9) and is centrally located in the upper end 48 of the outer tank 42 to help ensure symmetry of the effects of the exhaust plume on the spray chamber 40. In a like manner, the exhaust ports 46 are disposed on opposite sides of the entrance port 44 so that the saturated steam exiting the spray chamber 40 also affects the spray chamber 40 in a symmetrical fashion. The manway 52 on the side wall of the tank 42 facilitates both maintenance operations as well as inspections of the interior of the spray chamber 40. The drain assembly 54 allows excess condensate that may accumulate in the spray chamber 40 during exhaust recovery operations to be drained to a corresponding water tank (not shown) for storage and later processing. A plurality of instrumentation ports 47 are also provided in the side wall of the tank 42 to facilitate monitoring operating parameters such as, but not limited to, temperature, pressure, etc.

Figure 4:
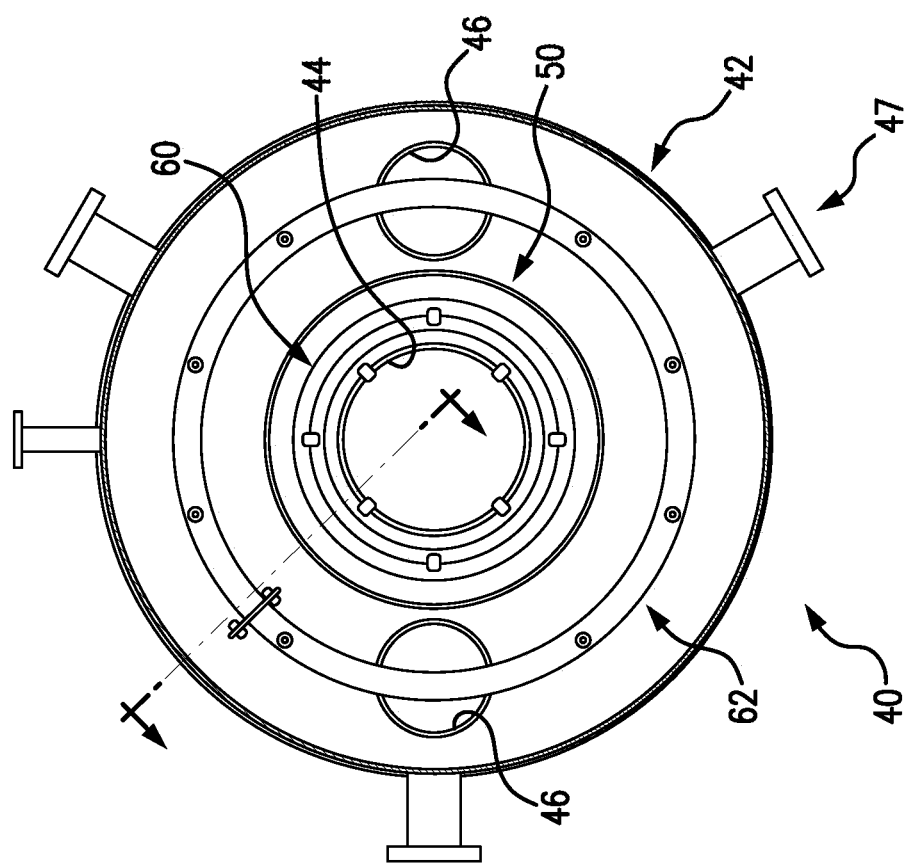
FIG. 4 is a cross-sectional view of the desuperheating spray chamber shown in FIGS. 2A and 2B.
Figure 3:
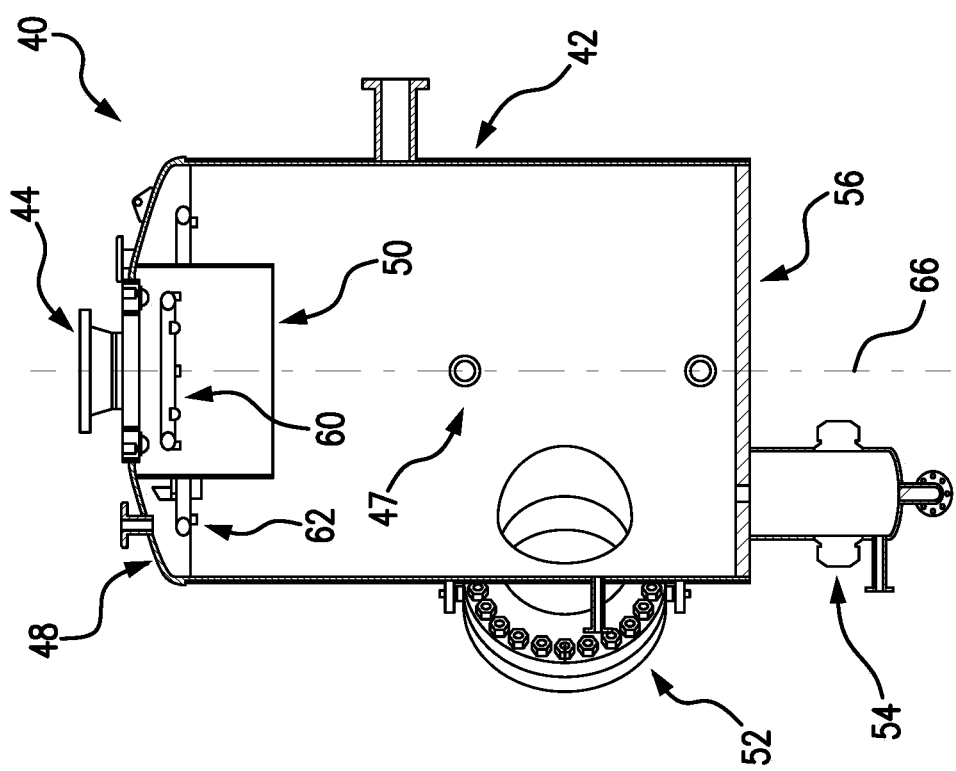
FIG. 3 is a cross-sectional view of the desuperheating spray chamber shown in FIGS. 2A and 2B.

Referring additionally to FIGS. 5 and 6, the shroud 50 is mounted to the inner surface of the upper end 48 of the tank 42 and is concentric to the entrance port 44 about a longitudinal center axis 66 of the tank 42. The inner shroud 50 extends only partially into the outer tank 42 and helps maintain the temperature of the upper portion of the tank's side wall within a desirable range as the rocket exhaust plume enters the spray chamber 40 by way of entrance port 42. As well, the shroud 50 so helps to direct the exhaust plume downwardly within the tank 42 to help insure proper mixing with the spray from the inner and outer spray rings 60 and 62. Preferably, the inner shroud 50 includes a plurality of apertures 68 along its upper edge to help maintain the upper components of spray chamber 40 within the desired temperature range. The apertures 68 allow some of the cooler steam that is about to exit the spray chamber 40 to be entrained into the interior of the shroud 50 by the exhaust plume 64 (FIG. 9), thereby helping to reduce the temperature of the exhaust plume 64 and the upper portion of the shroud 50 that is exposed to the highest temperatures. As best seen in FIGS. 3 through 5, the inner spray ring 60 is disposed within an upper portion of the inner shroud 50 and is concentric about the longitudinal center axis 66 of the spray chamber 42 with the shroud 50. The outer spray ring 62 is also concentric with the inner shroud 50 about the longitudinal center axis 66 of the spray chamber 40, but is disposed between the outer surface of the inner shroud 50 and the side wall of the outer tank 42.

Figure 8:
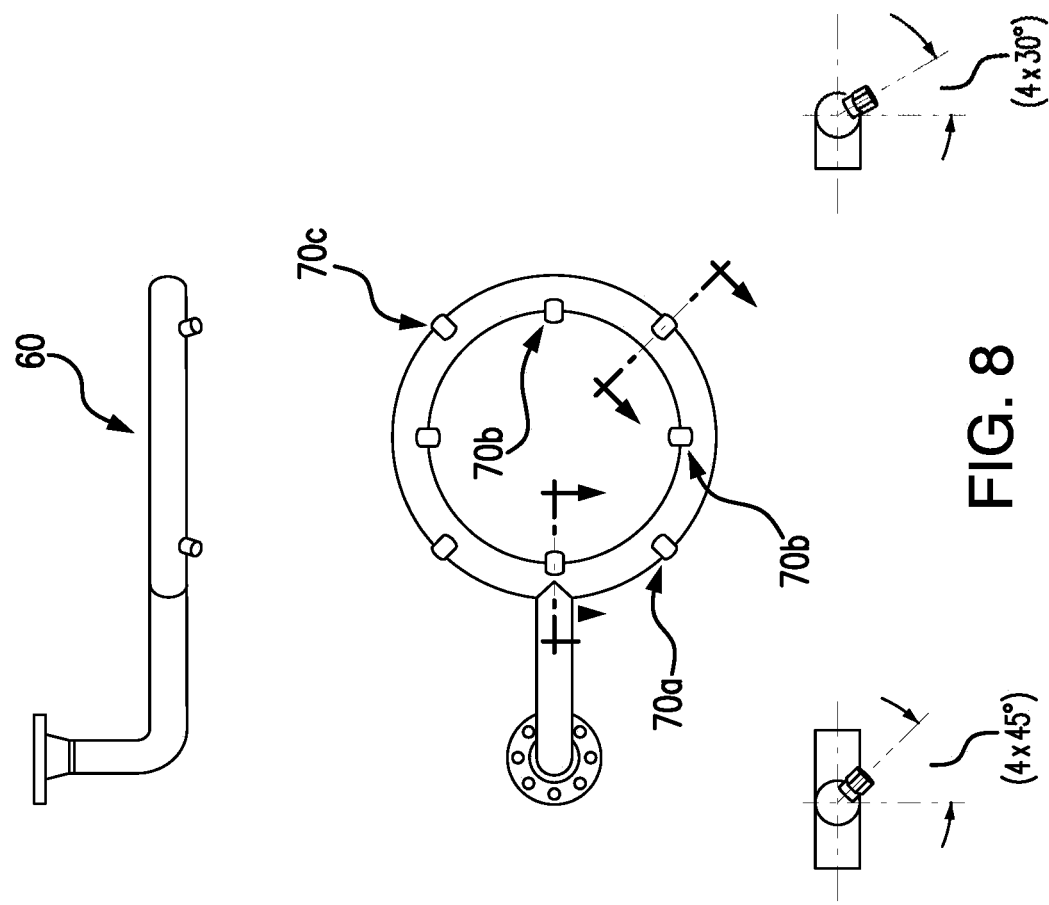
FIGS. 7 and 8 are various views of the outer spray ring and the inner spray ring, respectively, of the desuperheating spray chamber shown in FIGS. 2A and 2B.
Figure 7:
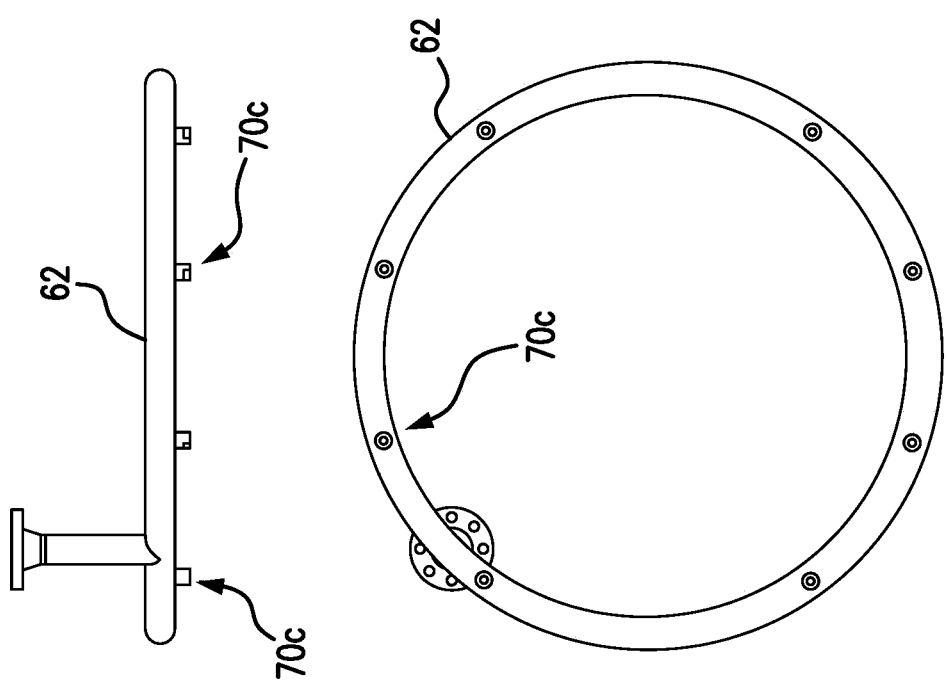

Referring additionally to FIGS. 7 and 8, both the inner spray ring 60 and the outer spray ring 62 include a plurality of spray nozzles spaced at even intervals thereon. In the present embodiment, each spray ring includes eight nozzles. Referring again to FIG. 5, four of the spray nozzles 70a on the inner spray ring 60 have spray axes that are directed outwardly at an angle of 30° relative to the longitudinal center axis 66 of the spray chamber 40, whereas the spray axes of the remaining four spray nozzles 70b are directed inwardly at an angle of 45° relative to the longitudinal center axis 66 of the spray chamber 40. The inwardly angled spray nozzles 70b are configured to make contact with the exhaust plume as it enters the spray chamber 40, thereby producing a rapid drop in temperature of the exhaust plume, whereas the outwardly angled spray nozzles 70a are configured to spray the shroud wall and make contact with the exhaust plume at a lower point within the shroud 50. The outwardly directed nozzles 70a assist in maintaining the temperatures of the shroud 50 within the desired range as a large portion of the spray is directed towards the inner surface of the shroud 50. As noted, the nozzles 70c of the outer spray ring 62 are vertically oriented and disposed outside the shroud 50. As such, spray from the nozzles 70c of the outer ring 62 is initially directed at the outer surface of the shroud 50 and the inner surface of the cylindrical side wall of the tank 42. Spray from the outer spray ring 62 only comes into contact with the exhaust plume once the spray is below the bottom of inner shroud 50.

Figure 10:
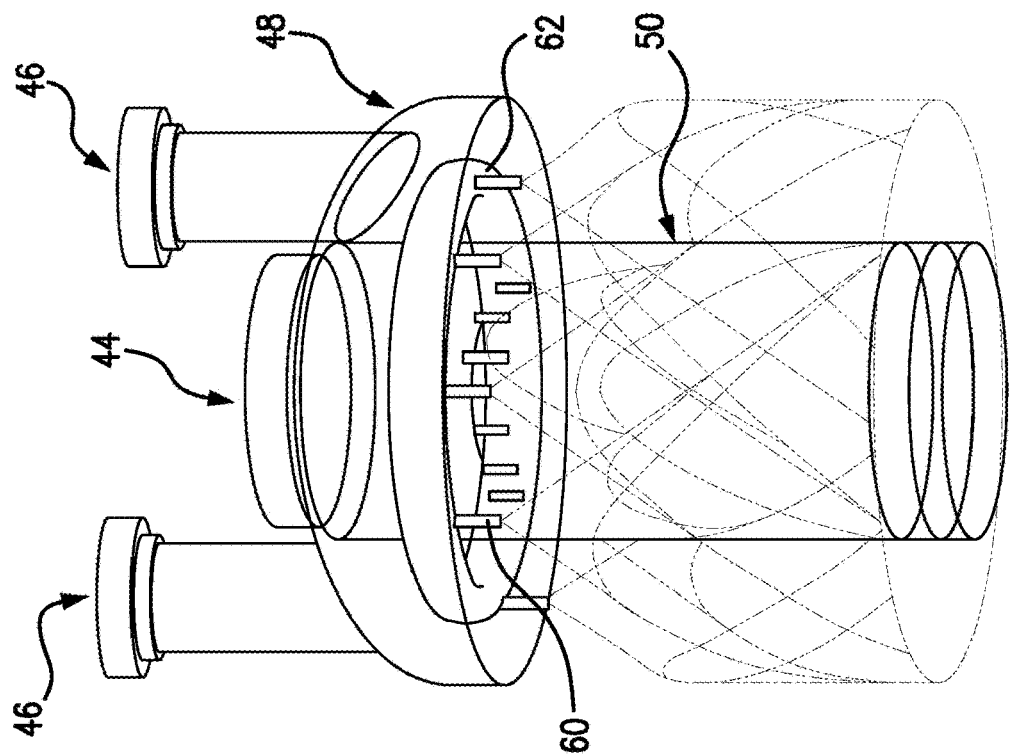
FIG. 10 is a partial perspective view of the desuperheating spray chamber shown in FIGS. 2A and 2B.
Figure 9:
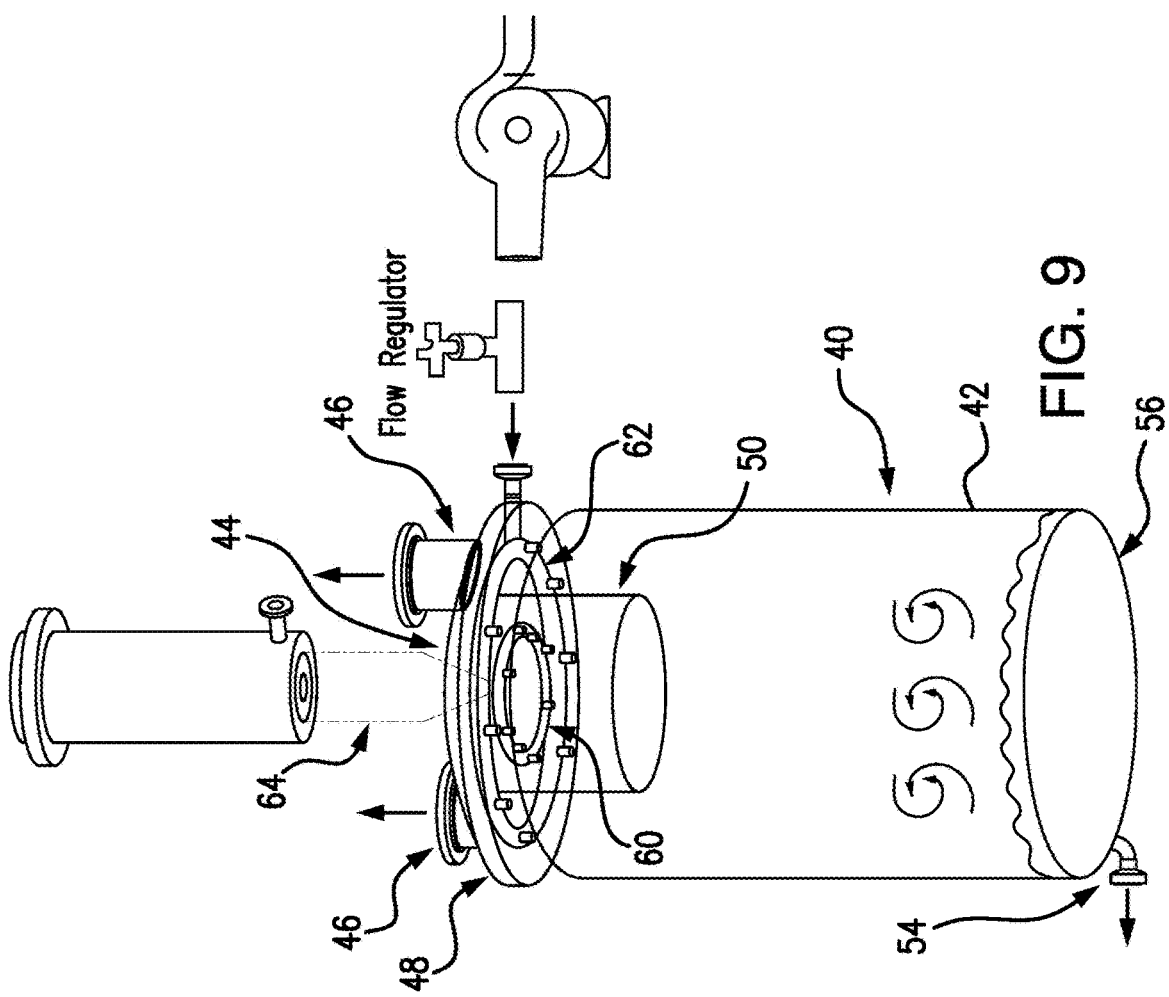
FIG. 9 is a perspective view of the desuperheating spray chamber shown in FIGS. 2A and 2B.

Computer modeling for the above described desuperheating super spray chamber 40 was conducted with the acceptance criteria being defined by the ASME Boiler & Pressure Vessel Code (BPVC), Section VIII, Div. 1. For an assumed rocket exhaust plume 64 temperature of 5,040 degrees Fahrenheit (° F.) at the entrance port 44 of the spray chamber 40, the wall temperature (Twall) of the outer tank 42 is to remain below 900° F., the operating pressure is to remain below 20 psia, the inlet/outlet mass balance is to be maintained, and fluid exit temperature at the exhaust ports 46 should be less than 250° F. In the described preferred embodiment for a rocket exhaust inlet flow of 2.8 pounds mass per second (lbm/s), a spray flow to the inner and outer spray rings 60 and 62 of 25.2 lbm/s is used, resulting in a total flow of spray of 180 gallons per minute (gpm). To achieve this desired flow, an example nozzle is the Series 491 nozzle, manufactured by LechlerUSA, that provides approximately 10.7 gpm at a pressure of 30 psid across the nozzle, and has a cone angle of 120°. FIGS. 9 and 10 show the operational set up of the above described spray chamber 40 and the overlapping spray patterns of the inner and outer spray rings 60 and 62, respectively.

Figures 11, 12:
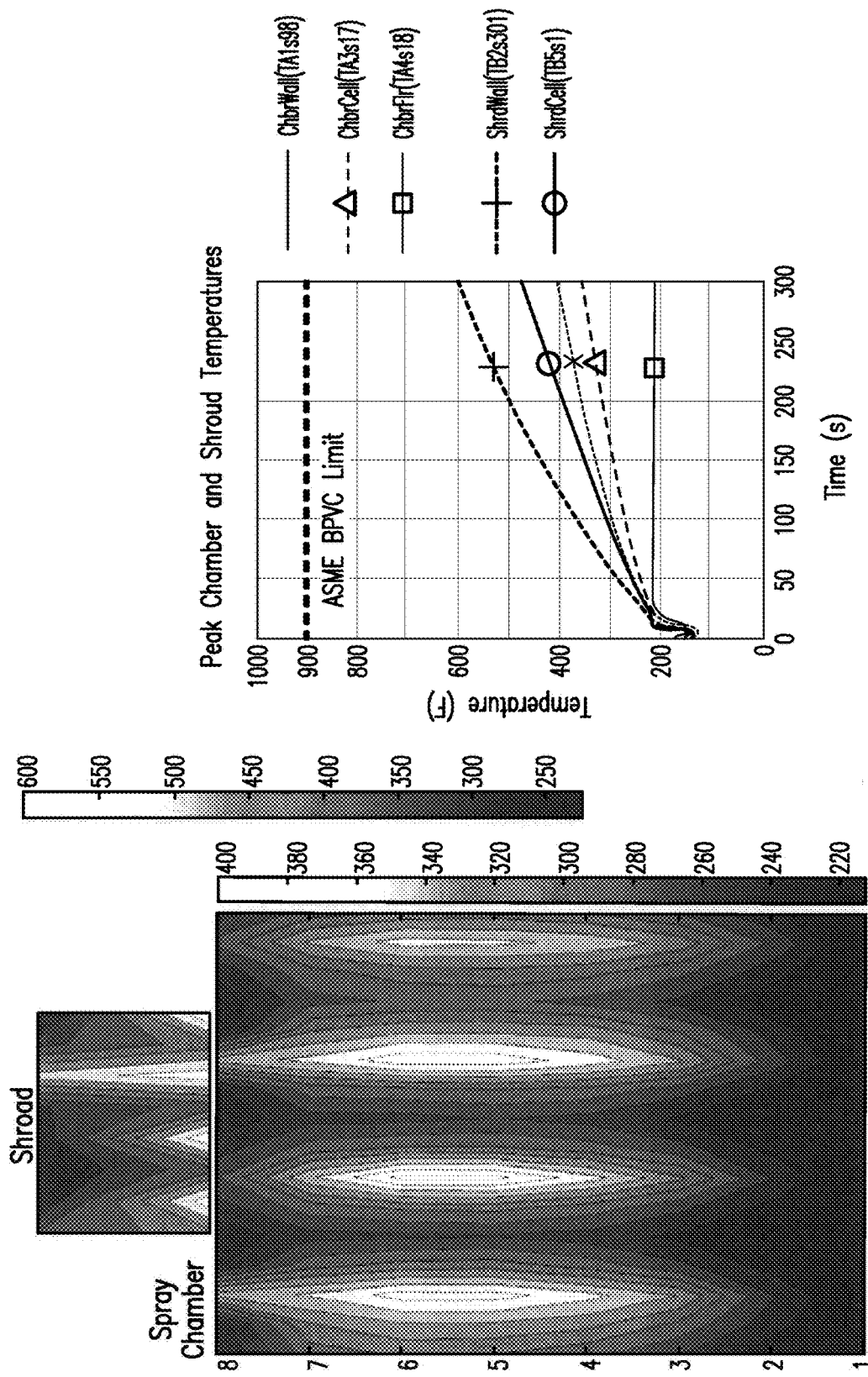
FIG. 11 is a surface temperature diagram of the desuperheating spray chamber shown in FIGS. 2A and 2B.
FIG. 12 is a temperature chart of the desuperheating spray chamber shown in FIGS. 2A and 2B.

Referring to FIGS. 11 and 12, computer modeling of the spray chamber described above resulted in the temperatures at all the monitored locations of the spray chamber being below the acceptable ASME BPVC limit of 900° F. after achieving steady-state operating conditions at 300 seconds. As shown in FIG. 12, the highest temperature encountered in the spray chamber was 600° F. at the wall of the shroud. Referring additionally to FIG. 13, the computer analysis also provided that the additional acceptance criteria of maintaining mass flow balance and minimizing pressure losses across the spray chamber were met. Note, the above described spray chamber 40 is scalable as needed base on the amount of exhaust to be recovered. For example, the dimensions of the spray chamber, nozzle flow rates, etc., may be adjusted as required. As well, for greater flow rates of exhaust, multiple spray chambers 40 may be operated in parallel.

These and other modifications and variations to the invention may be practiced by those of ordinary skill in the art without departing from the spirit and scope of the invention, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

The invention claimed is:

1. A desuperheating spray chamber for use in a rocket exhaust recovery system for a nuclear thermal propulsion rocket, comprising:
    a substantially-cylindrical outer tank with an upper end including an entrance port and two exhaust ports disposed thereon;
    a substantially-cylindrical shroud extending downwardly from an inner surface of the upper end of the tank, wherein the shroud is concentric to the entrance port about a longitudinal center axis of the outer tank;
    an annular inner spray ring that is both disposed within and concentric to the shroud about the longitudinal center axis; and
    an annular outer spray ring that is disposed between a side wall of the outer tank and the shroud, the annular outer ring being concentric to the shroud about the longitudinal center axis.

2. The spray chamber of claim 1, further comprising a drain assembly in fluid communication with a bottom end of the outer tank.

3. The spray chamber of claim 1, further comprising a manway extending radially-outwardly from the side wall of the outer tank.

4. The spray chamber of claim 3, further including ports extending radially-outwardly from the side wall of the outer tank for receiving instrumentation.

5. The spray chamber of claim 1, further comprising a first set of nozzles disposed on the inner spray ring.

6. The spray chamber of claim 5, wherein each nozzle of the first set of nozzles has a spray axis that defines one of an obtuse and an acute angle with respect to the longitudinal center axis of the outer tank.

7. The spray chamber of claim 5, further comprising a second sent of nozzles disposed on the outer spray ring, each nozzle of the second set of nozzles having a spray axis that is parallel to the longitudinal center axis of the outer tank.

8. A desuperheating spray chamber for use in a rocket exhaust recovery system for a nuclear thermal propulsion rocket, comprising:
    a substantially-cylindrical outer tank with an upper end including an entrance port and at least one exhaust port disposed thereon;
    a substantially-cylindrical shroud extending downwardly from an inner surface of the upper end of the tank;
    an inner spray ring that is disposed within the shroud about a longitudinal center axis of the outer tank; and
    an outer spray ring that is disposed between a side wall of the outer tank and the shroud, and is concentric to the shroud.

9. The spray chamber of claim 8, further comprising a drain assembly in fluid communication with a bottom end of the outer tank.

10. The spray chamber of claim 8, further comprising a manway extending radially-outwardly from the side wall of the outer tank.

11. The spray chamber of claim 10, further including ports extending radially-outwardly from the side wall of the outer tank for receiving instrumentation.

12. The spray chamber of claim 8, further comprising a first set of nozzles disposed on the inner spray ring.

13. The spray chamber of claim 12, wherein each nozzle of the first set of nozzles has a spray axis that defines one of an obtuse and an acute angle with respect to the longitudinal center axis of the outer tank.

14. The spray chamber of claim 12, further comprising a second set of nozzles disposed on the second outer spray ring.

15. The spray chamber of claim 14, wherein each nozzle of the second set of nozzles has a spray axis that is parallel to the longitudinal center axis of the outer tank.

* * * * *